June 14, 1927.  L. RUEGG  1,632,418
FAUCET
Filed Aug. 28, 1926
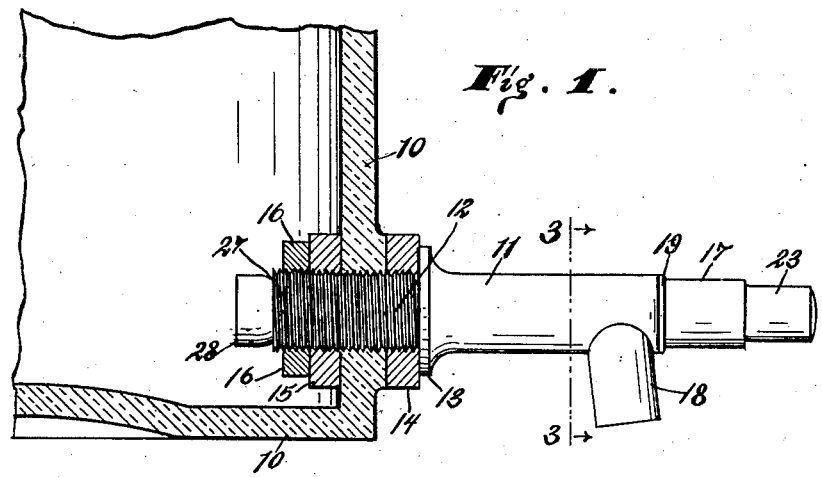
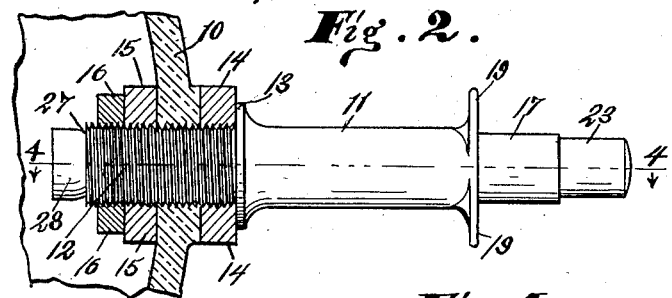
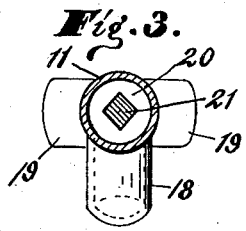
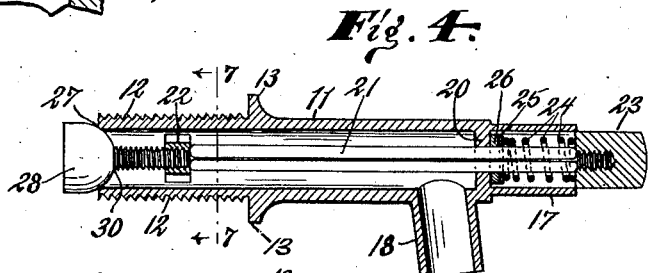
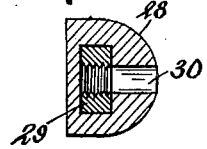
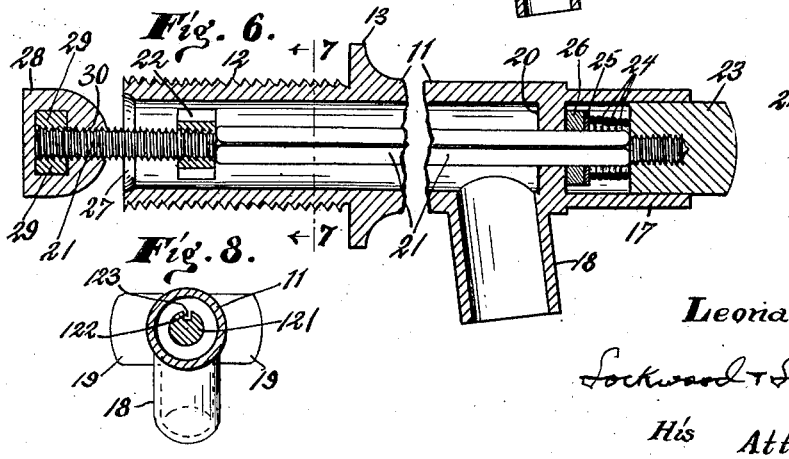
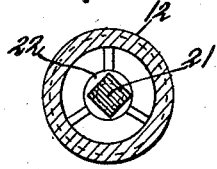
Inventor.
Leonard Ruegg
by
Lockwood & Lockwood
His Attorneys.

Patented June 14, 1927.

1,632,418

UNITED STATES PATENT OFFICE.

LEONARD RUEGG, OF LOS ANGELES, CALIFORNIA.

FAUCET.

Application filed August 28, 1926. Serial No. 132,094.

A feature of the invention consists in the combination with a hollow casing, and a spring held longitudinally reciprocable valve stem mounted therein so as not to be rotatable and the inner end of which is threaded, of an imperforate valve which has a nut embedded within it that is screwed on the threaded end of the valve stem, whereby a very practical faucet is provided which will not leak through the valve and the valve cannot be released from the valve stem by rotating the latter in the faucet.

Along with the foregoing are other novel features: the valve stem being angular in cross section and reciprocating through an integral guide wall in the casing with an angular opening to prevent rotation of the valve stem; providing the inner end of the casing with a spherically disposed valve seat and the cooperating surface of the valve being spherically disposed; and making the valve of rubber and molding it about the nut, and also the extension of the portion of the valve, which extends into the casing, appreciably beyond the nut and so it will tightly engage the threaded portion of the valve stem.

An object of this invention is to provide a faucet having a valve stem that is adapted to be reciprocated endwise, with means associated with the stem that will hold it from rotating on its longitudinal axis. To that end, I provide a stem that can be easily moved endwise to open and close a valve; but it cannot be rotated. The reason for preventing the stem from rotating is to avoid loosening or displacing the valve that is screwed on the inner end of the stem. The construction of the faucet is such that the valve is normally closed and it is held with considerable force against the valve seat to prevent leakage; and while thus engaging the seat the valve is apt to be loosened or entirely displaced if the stem is turned in a direction that would unscrew the valve. Heretofore lock nuts have been employed to more securely attach the valve to their stems such as a lock nut, but by practice I have found that lock nuts are entirely unnecessary and that a valve will remain in a relatively fixed position on a valve stem if the latter is kept from rotating on its longitudinal axis. Also I have discovered that the tendency of a lock-nut when screwed up tight against a rubber valve is to distort its face so that it will not fit perfectly in the valve seat; and that by eliminating the locknut a practically perfect seating of a valve is accomplished without a liability of it being loosened or displaced in use.

Another object of the invention is to hold the valve stem from rotation so that when the valve is opened and permitted to close all points on the face of the valve that contact with the valve seat will always be returned to substantially the same place. In other words the repeated seating of the valve on the valve seat always in substantially the same way causes a matrix of the valve seat surface to form in the face of the rubber valve that will positively prevent leakage when the valve is seated.

Features of invention are shown in the construction, combination and arrangement of the parts whereby a faucet is provided which is neat and pleasing in appearance; simple to install and operate and that is durable in use.

Other objects, advantages and features of invention may appear from the accompanying drawing, the subjoined detailed description and the appended claims.

In the drawings:

Figure 1 is a side elevation of a faucet constructed in accordance with this invention showing it attached to a tank, a portion of which is shown in vertical section; Fig. 2 is a plan view of the faucet showing it attached to a tank, a portion of which is shown in cross section; Fig. 3 is a cross section on line 3, 3 of Fig. 1 showing in detail the means for preventing the valve stem from being rotated on its longitudinal axis; Fig. 4 is a vertical section on line 4—4, Fig. 2, with the valve closed; Fig. 5 is an enlarged vertical section through the valve removed from the valve stem; Fig. 6 is an enlarged fragmental vertical section analogous to Fig. 4 showing the valve in open position; Fig. 7 is a cross section on line 7—7, Fig. 6; Fig. 8 is a cross section analogous to that shown in Fig. 3 showing a modified means for holding the valve stem from being rotated on its longitudinal axis.

There is shown in the drawings hereof for the purpose of illustrating the general nature of this invention, a tank 10, which may be a drinking-water tank of familiar character, or any other kind of fluid receptacle for any purpose, and a faucet having an outer tube or casing 11 with a threaded end portion 12 that extends through the wall of the tank and is held therein by the shoulder 13, washers 14 and 15, and nut 16. The outer end of said casing 11 is reduced at 17, which lies outward beyond the downwardly extending spout 18. There are two laterally and oppositely extending wings 19 between the main portion of the casing 11 and the reduced end 17, which serve as finger pieces for holding the two fingers of the hand when the faucet is operated. There are no wings extending vertically, and these wings or finger pieces register with the forward margin of the spout 18 so that when the two fingers are placed on said finger pieces the spout will lie between the fingers and thus cause the spout and finger pieces to cooperate in enabling one to conveniently operate the faucet. Within the casing between the ends thereof there is a wall or partition 20 and it is in the same plane as the finger pieces and the forward wall of the spout, as seen in Figs. 4 and 6.

A valve stem 21 that is rectangular in cross section extends through a rectangular passage in the guide wall 20 and has bearing therein and is arranged so that it can be reciprocated endwise through the wall but is prevented from being rotated in its longitudinal axis. The inner end of the stem 21 extends through a movable bearing member 22. There are three radiating flanges or ribs which loosely engage the interior of the casing 11 and centralize the valve stem. The outer end of the valve stem is threaded to receive the push button 23 which extends outwardly beyond the casing 11 when the faucet is assembled.

A spiral spring 24 surrounds the valve stem 21 and lies between the button 23 and a metal washer 25 that is arranged on the stem 21 so that it holds a fibrous packing washer 26 against the wall 20; and the tendency of such spring is to force the packing washer 26 against the wall 20 so as to prevent leakage through the rectangular opening; and to also force the valve stem outward and hold the valve seated. The inner end of the casing is provided with a valve seat 27 best shown in Fig. 5.

The valve 28 is preferably made of rubber, substantially cup-shaped, and the outer end of it is formed to snugly fit the valve seat 27. This valve 28 is molded around a nut 29 that is adapted to be screwed on the threaded inner end of the valve stem 21. For that purpose the inner threaded end of the valve stem is adapted to exend through a hole 30 in the valve that registers with the threaded opening in the nut 29. When the valve is screwed on the valve stem, preferably to the limit of the nut, it is held in a relatively fixed position on the stem by the rubber that extends beyond the nut so that it is not necessary to use a lock nut to additionally secure the valve to the stem.

As best shown in Fig. 5 the diameter of the hole 30 is slightly less than the outside diameter of the thread through the nut 29 so that when the valve is screwed onto the valve stem a considerable portion of the rubber will grip the stem and securely fix the valve in place Also the nut is embedded so deeply in the valve and beyond the middle thereof that the main portion of the nut and valve seat and inwardly beyond the nut the valve stem so snugly surrounds the valve stem so as to make a very strong and practical faucet construction.

From the foregoing explanation it will be understood that the valve 28 is effectively secured to the valve stem without the aid of a lock nut; and also that the stem cannot be rotated so as to loosen or unseat the valve; and also as fully described in the patent application heretofore referred to, the inner end and peripheral surface or exposed portions of the rubber valve are imperforate, so that when the valve is closed, as shown in Fig. 4, there is absolutely no chance for any leakage of fluid through it. It is held tightly against its seat by the spring so that no fluid can escape. The faucet is secured to the tank by rubber washers 14 and 15 so that there is no leakage at that point. With such arrangement the valve can never leak or be accidentally loosened or displaced from the stem.

It is understood that various means may be employed to hold the valve stem 21 from rotation but for the sake of brevity only one modified means is shown. As seen in Fig. 8 I employ a valve stem 121 that is round in cross relation and it is provided with a groove 122 into which a feather 123 extends so that the valve stem can be fully moved endwise but not rotated. The feather 123 can be integral with the wall 20 as shown.

I claim as my invention:

1. A faucet having a hollow casing with a valve seat formed on the inner end thereof, a straight spring-held valve stem longitudinally movable centrally in said casing and threaded at its inner end, means for preventing the valve stem from turning in the casing, an imperforate valve made of rubber and the like and an angular nut embedded in and enveloped by said valve with the major thickness of the valve extending inward beyond the nut and surrounding the valve stem so that the nut is not removable therefrom and is adapted to screw on the threaded end of the valve stem and is behind the main portion of the valve that engages the valve seat, substantially as set forth.

2. A faucet substantially as set forth in claim 1, in which the means for preventing the turning of the valve stem consists of the valve stem being angular in cross section, and a guide wall integral in the casing having an opening through which the valve stem reciprocates, said opening in the guide wall being of the same form and dimensions substantially as a cross section of the valve stem.

3. A faucet substantially as set forth in claim 1, in which the valve seat is concave and spherically disposed, and the portion of the valve which engages the valve seat is convex and spherically disposed, substantially as set forth.

4. A faucet substantially as set forth in claim 1, in which the valve is formed of rubber with the nut embedded therein and enveloped thereby and projecting appreciably beyond the nut and with its bore of less diameter than the threads of the valve stem so as to screw on and snugly fit the threaded portion of the valve stem, substantially as set forth.

In witness whereof, I have hereunto affixed my signature.

LEONARD RUEGG.